United States Patent Office 2,926,872
Patented Mar. 1, 1960

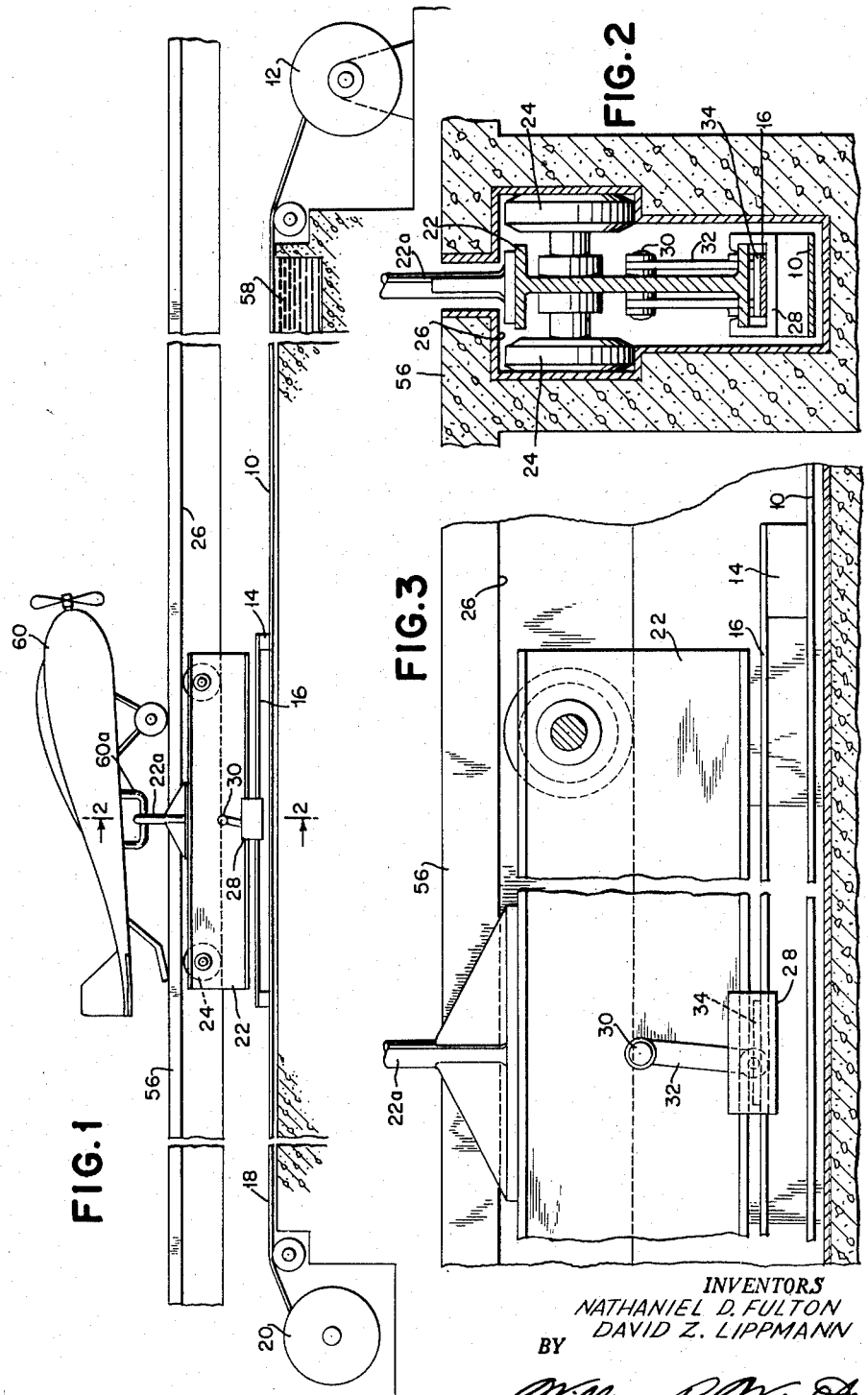

2,926,872

AIRCRAFT LAUNCHING APPARATUS

Nathaniel D. Fulton, Bernardsville, and David Z. Lippmann, Denville, N.J., assignors, by mesne assignments, to Thiokol Chemical Corporation, a corporation of Delaware Application March 15, 1957, Serial No. 646,306

6 Claims. (Cl. 244—63)

The present invention relates to launching devices for airplanes and the like, and more particularly to improvements in the manner of launching whereby the shock of impact between the aircraft and the launching device is minimized.

The principal object of the invention is to provide improved means for transferring the stored energy of a flywheel to an airplane through an intermediate belt, whereby connection is effected when the airplane and the belt are traveling at the same linear velocity.

A further object of the invention resides in the provision of means for effecting an increase in the linear velocity of a belt being wound on a drum greater than normally attained through overlapping winding.

Other objects of the invention will be pointed out in the following and claims and illustrated in the accompanying drawings, which disclose, by way of examples, the principles of the invention and the best mode, which has been contemplated, of applying that principle.

In the drawings:

Fig. 1 is a diagrammatic side view of the launching belt, with its power driven sheave and connected launching shuttle;

Fig. 2 is a sectional view taken on lines 2—2 of Fig. 1 showing the connecting device for coupling the shuttle and belt;

Fig. 3 is a further detail of the coupler of Fig. 2;

Figure 5:
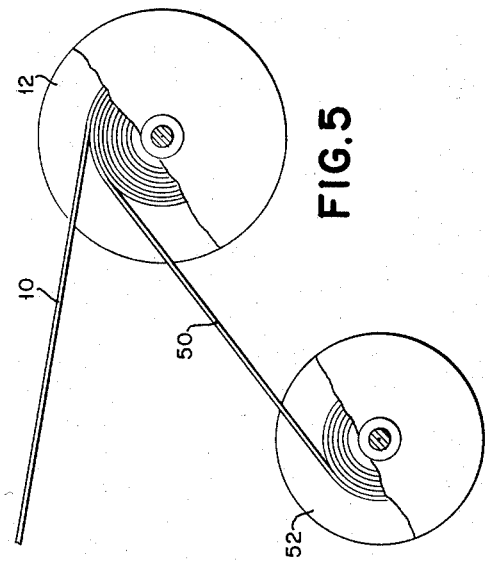
Fig. 5 is a view of an arrangement for obtaining increased acceleration of the belt.

Referring to Fig. 1, there is shown a power driven launching belt 10 secured to sheave 12 at one end and to a block 14 at the other. Also connected to block 14 is a steel tape 16 and a return cable 18, which latter extends to a takeup spindle 30.

Above the steel tape 16 is a shutter 22 of I beam construction (Fig. 2) provided with rollers 24 guided for movement in the direction of tape 16 by channel structure 26. Secured to the underside of shuttle 22 is a shoe 28 configured to provide a passage through which tape 16 passes. Pivoted on channel 22 at 30 is a lever 32 which passes through a suitable slot to carry a coupling shoe 34 above the tape 16. Lever 32 is of such length as to provide a clamping action to grip the tape 16 between shoes 34 and 28, when the tape is moving to the right with respect to the shuttle, and to release such clamping when the shuttle moves to the right with respect to the tape. In other words, lever 32 acts in the manner of a pawl, being long enough, so that wedging of shoe 28 upon tape 16 occurs before lever 32 reaches a fully vertical position with respect to tape 16 as tape 16 moves to the right with respect to the shuttle.

Tape 16 therefore will be gripped by shoes 28 and 34 and therethrough impel the shuttle toward the right only when the tape is traveling faster than the shuttle.

Figure 4:
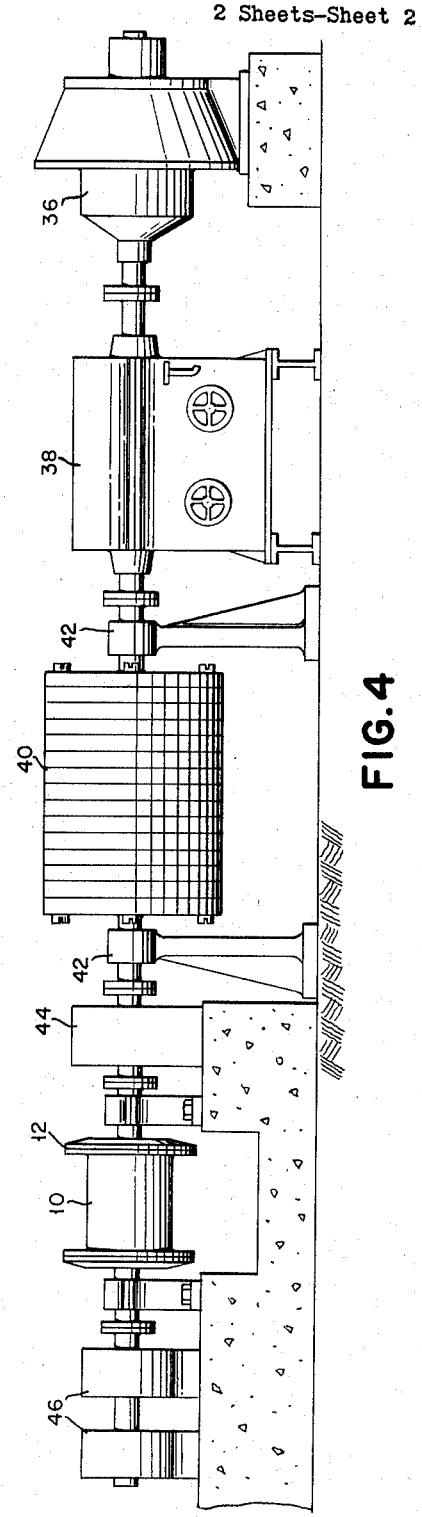
Fig. 4 is an end view looking from the right in Fig. 1 showing the flywheel and power plant.

The power drive for belt 10 is shown in Fig. 4 where 36 represents a turbo compound engine connected to a hydraulic coupling 38 to provide a variable speed drive to flywheel 40 which is rotatable in bearings 42. Coaxial with the flywheel 40 is the belt sheave 12 and between the two is a so-called synchronizing clutch 44 for bringing the sheave up to the desired speed. While the sheave is being brought up to speed, the only load on the clutch will be the inertia of the sheave and the belt. The shuttle 22 has secured thereto an upstanding post 22a extending into a ring socket 60a of airplane 60 (Fig. 1), so that with the airplane in motion under its own power it will propel shuttle 22 in the same direction and will be moving faster than belt 10.

As soon as the sheave has come up to speed and before the airplane and shuttle load are on the clutch 44, the clutch is locked over a positive coupling. Thus, the clutch is not required to take a heavy load and can be of small and simple construction.

To the left of sheave 12 is a pair of liquid cooled friction brakes 46 for stopping the rotation of the sheave after the launching and the disconnection of clutch 44. With the arrangement illustrated, engine 36 through coupling 38 drives flywheel 40 which is of considerable mass and will be kept in constant motion throughout a succession of launchings, with a fraction of its stored energy employed to drive sheave 12 and belt 10.

A major problem in a flywheel type of apparatus is in the clutching of high peak horsepower from the flywheel to the load, in addition to the fact that as the flywheel slows down, the aircraft must accelerate. With the arrangement of the present invention, the clutching action required is simply to set a belt and sheave in motion and, as the belt wraps around itself, the required degree of acceleration is obtained.

A manner in which still greater acceleration is obtainable is shown in Fig. 5, where a spacer web 50 wound about a spindle 52 is fed around sheave 12 to cause a more rapid increase in the driving diameter of belt 10, and hence greater acceleration. The spindle 52 is returned through spring action, not shown.

Figure 6:
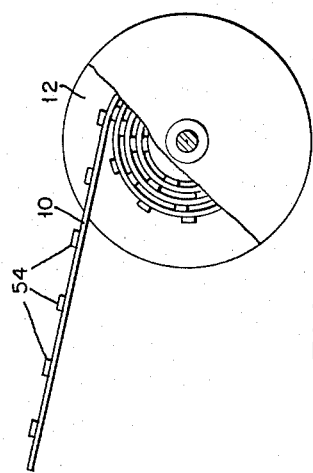
Fig. 6 is another form of arrangement for obtaining increased belt acceleration.

Another form of acceleration increase is shown in Fig. 6 where it is indicated that the belt 10 may be provided with cleats or spacer strips 54 on one surface to obtain the same effect of more rapidly increasing the belt diameter on the sheave.

Still another manner of keeping the belt acceleration constant, even though the flywheel speed decreases, is attained by tapering the belt, so that the last part wound on the sheave is thicker than the leading end.

Referring again to Fig. 1, the apparatus described is mounted below the runway surface 56 with suitable guides (not shown) provided for the belt to control any whip therein. Suitable braking or other stopping devices may be provided to decelerate and stop the shuttle at the end of its run as, for example, a well known form of water trough indicated at 58.

Airplane 60 to be launched is connected through ring and post 60a, 22a to shuttle 22, so that the plane can initially draw the shuttle ahead and thereafter be pushed by the shuttle as the latter's speed reaches and passes that of the airplane. The upper end of post 22a is arranged for disconnection from the airplane by the rising of ring 60a when the airplane has reached a self-sustaining velocity.

Operation

With the apparatus arranged and constructed as explained hereinabove, the sequence of operations involved in launching an airplane will now be set forth. At the beginning of a series of launchings the engine 36 is started and through hydraulic coupling 38 the flywheel 40 is brought up to speed with both it and the engine operating continuously during the entire series of launchings.

At the beginning of a run, the winding sheave 12 is stationary and belt 10 is held taut at the end of the runway by the rewind cable 18, through its tensioned spindle 20. The aircraft 60 is coupled to shuttle 22 through post 22a and ring 60a and is started forward under its own power, drawing the shuttle with it. Because of the clamping structure 32, the shoes 34 and 28 slide along steel tape 16 without gripping it.

When the aircraft and shuttle have reached a predetermined speed, the clutch 44 between the flywheel 40 and sheave 12 is engaged and the belt 10 is started. As soon as it is up to speed and before the belt through tape 18 is clamped to the shuttle, the winding sheave is locked to the flywheel. At this point the aircraft and shuttle are in motion at the aircraft speed, and belt 10 is approaching and will soon exceed this speed. When such speed is reached, clamping action takes place, and the stored energy of the flywheel accelerated through the belt will thereafter supplement the aircraft's power to bring it up to launching velocity, at which point the airplane disconnects from post 22a.

The winding sheave 12 is disengaged from the flywheel and the shuttle and sheave are braked to a stop. A return motor, not shown, may then be operated to wind up the return cable to bring the shuttle back to starting position and hold the belt taut in readiness to attach the next aircraft to the shuttle and repetition of the launching cycle.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In an aircraft launching system, a launching belt, power means for driving the belt in one direction, a shuttle adjacent to said belt, and provided with means for coupling the same to an aircraft to be launched and initially advanceable along the belt under power of the aircraft, slip clutch means carried by the shuttle for automatically connecting the shuttle to the belt when the speed of the belt exceeds the speed of the shuttle, and means for causing continued acceleration of the belt to bring the shuttle and coupled aircraft up to launching speed.

2. In an aircraft launching system, a launching belt, power means for driving the belt in one direction, a shuttle adjacent to said belt and provided with means for coupling the same to an aircraft to be launched, and initially advanceable along the belt under power of the aircraft, a uni-directional clutching device between the shuttle and the belt through which connection the belt will drive the shuttle only when the belt speed exceeds the shuttle speed, and means for causing the belt to accelerate to bring the shuttle up to launching speed.

3. The invention set forth in claim 2 in which the belt is driven by reeling on a power driven sheave, and the means for causing acceleration comprises a means to increase the effective thickness of the belt.

4. The invention set forth in claim 2 in which the belt is driven by reeling on a power driven sheave, and the means for causing acceleration comprises means to increase the effective thickness of the belt as it is reeled on the sheave.

5. The invention set forth in claim 2 in which the power means for driving the belt comprises a flywheel, an engine, a coupling therebetween, and a belt sheave with a synchronizing clutch between the flwheel and the sheave, said belt being connected at one end to the sheave for winding thereon.

6. Means for launching an airplane of the character described having a belt, power driven in one direction and returned in the opposite direction, a launching shuttle, guide rails extending parallel to the direction of movement of said belt for guiding the shuttle, a first shoe integral with the shuttle positioned to slide along one side of the belt, a second shoe mounted on the shuttle to slide along the opposite side of the belt and movable with respect to the shuttle to move toward the first shoe and clamp the belt therebetween, and means connected to said second shoe responsive to the relative rates of movement of the shuttle and belt to effect said clamping action.

References Cited in the file of this patent

UNITED STATES PATENTS 2,390,677     Alkan _____ Dec. 11, 1945